United States Patent [19]
Watanabe et al.

[11] Patent Number: 4,853,733
[45] Date of Patent: Aug. 1, 1989

[54] PROGRAM REWRITABLE CAMERA

[75] Inventors: Youji Watanabe, Sagamihara; Minoru Matsuzaki; Junichi Itoh, both of Hachioji, all of Japan

[73] Assignee: Olympus Optical Company Limited, Japan

[21] Appl. No.: 216,761

[22] Filed: Jul. 8, 1988

[51] Int. Cl.⁴ .............................................. G03B 7/00
[52] U.S. Cl. .................................... 354/412; 354/443; 354/105; 354/289.1
[58] Field of Search ............... 354/412, 105, 106, 107, 354/108, 109, 289.1, 442, 443

[56] References Cited

U.S. PATENT DOCUMENTS

| | | | |
|---|---|---|---|
| 4,384,771 | 5/1983 | Sakurada et al. | 354/105 |
| 4,449,805 | 5/1984 | Sakurada et al. | 354/105 |
| 4,455,068 | 6/1984 | Izuhara | 354/412 |
| 4,477,164 | 10/1984 | Nakai et al. | 354/412 |
| 4,519,692 | 5/1985 | Michalik | 354/412 |
| 4,728,978 | 3/1988 | Inoue et al. | 354/289.1 |
| 4,733,265 | 3/1988 | Haraguchi et al. | 354/412 |
| 4,769,665 | 9/1988 | Dagborn | 354/412 |

Primary Examiner—Russell E. Adams
Attorney, Agent, or Firm—Louis Weinstein

[57] ABSTRACT

A program rewritable camera includes camera elements for conducting camera operation, a control circuit for controlling said camera elements in response to coded control orders, a first memory for storing said control orders and an input circuit for enabling part or all of the contents stored in said first memory to rewrite by a peripheral device disposed outside the camera body. Connecting the peripheral device to the camera, camera functions desired by a photographer can be transferred to and stored in said first memory from the peripheral device in which various camera functions have been stored, through said input circuit to put the camera into action.

20 Claims, 15 Drawing Sheets

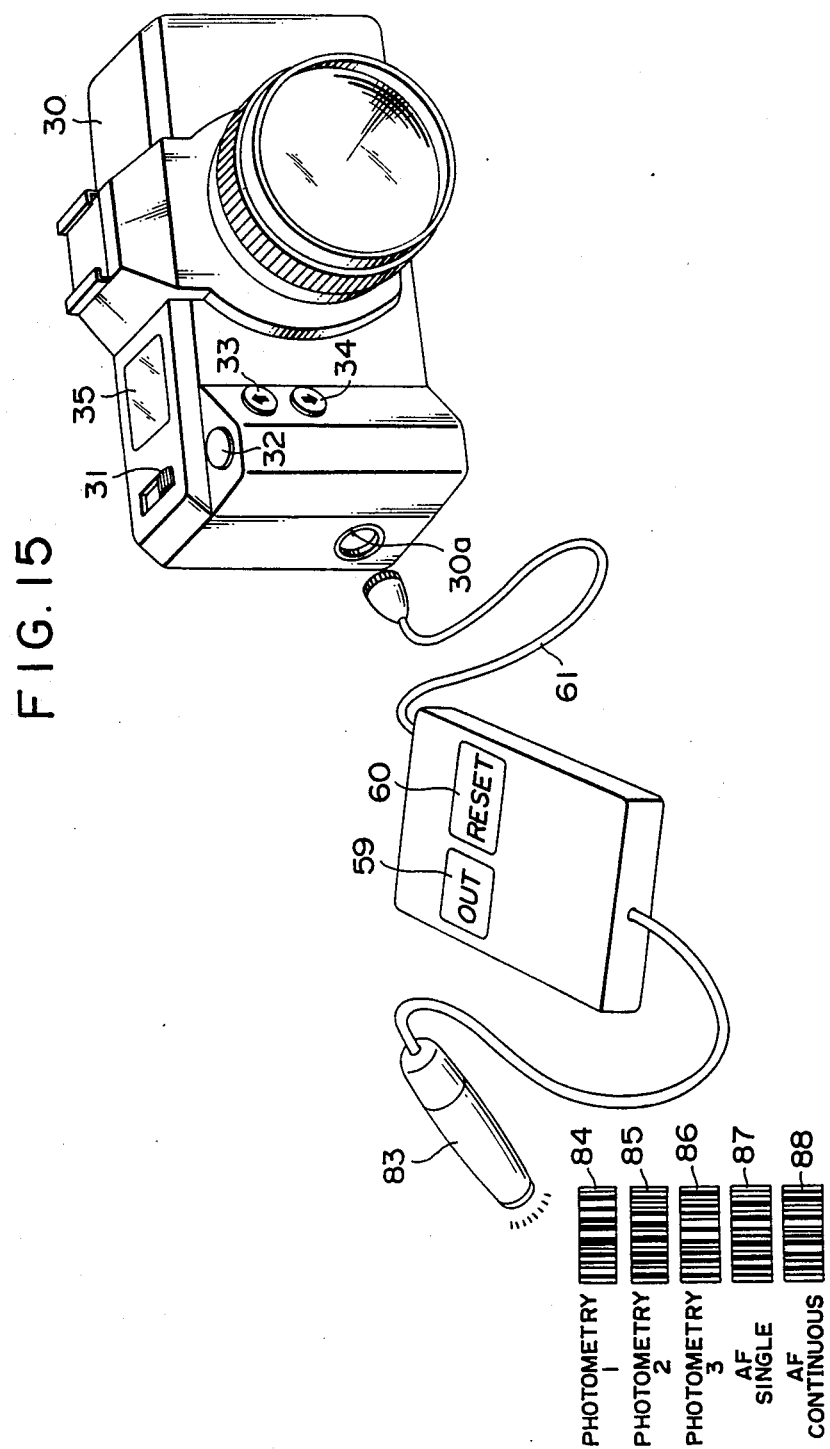

PROGRAM REWRITABLE CAMERA

FIELD OF THE INVENTION AND RELATED ART STATEMENT

The present invention relates to a program rewritable camera, and more particularly, to a fully automatic camera system which is controlled by data stored in a memory within the camera body.

Recently, the electronization of cameras has taken rapid strides and there have been made a great number of proposals for various functions of cameras which would be difficult to carry out with conventional mechanical cameras. Taking an exposure operation as an example, as a multi-spot photometry, automatic rear light compensation, multi-program automatic exposure and the like can not be accomplished without an electronic circuit, especially a microcomputer. In the extreme case, it is possible to construct a camera which has a quite different function only by changing a software within a microcomputer even when the camera has the same mechanical structure and electronic circuit arrangement. Therefore, in the current market, there are a great number of cameras of the type in which functions according to photographer's needs are added to fundamental functions for taking pictures.

Furthermore, there are a number of cameras whose functions are expandable by attaching operating members as camera accessories to a camera body.

However, the needs in the camera market are so various that it is impossible to satisfy all users with functions provided by camera makers. Consequently, camera users must disadvantageously procure several kinds of cameras which have their desired functions respectively. And yet, it is extremely inconvenient to provide all the manifold needs of users in a single camera body because of shortage of memory capacity in a software and complication in operations and provision of switches and the like.

OBJECT AND SUMMARY OF THE INVENTION

It is an object of the present invention to provide a program rewritable camera in which photographer's desired functions can be optionally selected and its operation is extremely simple.

A program rewritable camera according to the present invention, as shown in FIG. 1, comprises a camera element 2 for effecting camera operation, control means 3 for controlling the camera element 2 in response to coded control commands, first memory means 4 for storing the control commands and input means 5 for enabling to rewrite of part or all of the stored data in the first memory means 4 by a peripheral device 6 provided on the outside of a camera 1, within the camera 1. It is possible to store the desired functions in the first memory means 4 from the peripheral device through the input means 5 by connecting the peripheral device 6 to the camera 1.

According to the present invention, it is possible to select and store only required ones out of a plurality of functions, yielding the following remarkable effects.

(1) A function can be optionally set in accordance with purposes of photographing.

(2) A camera having the desired functions can be realized with a single camera.

(3) Complication of operation due to unnecessary functions can be eliminated.

(4) The reliability is improved because of a reduced number of operating members and a cost is reduced.

BRIEF DESCRIPTION OF THE DRAWINGS

FIG. 15 is a diagram showing a modification of the second embodiment of the present invention shown in FIG. 11.

DETAILED DESCRIPTION OF PREFERRED EMBODIMENTS

Figure 1:
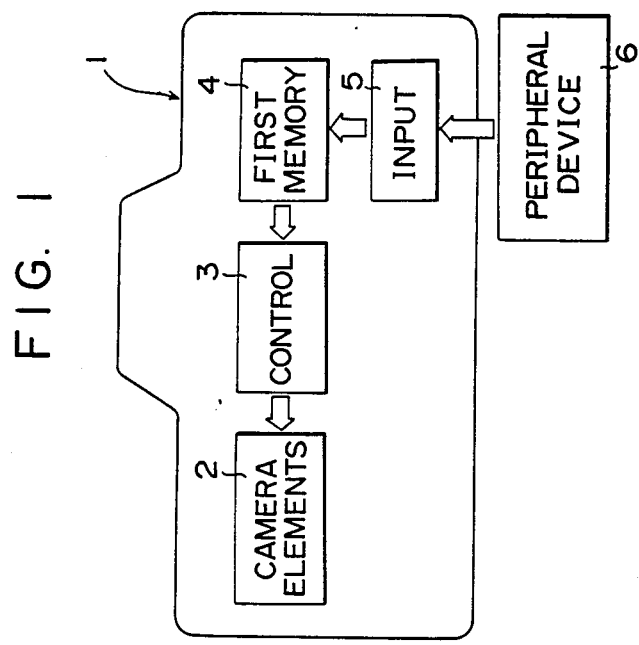
FIG. 1 is a diagram showing a fundamental structure of a fully automatic camera system according to the present invention.

Embodiments of a program rewritable camera according to the present invention, which will be described hereinafter, comprise a first memory in which a software for effecting fundamental functions of camera operation has been stored as the first memory 4 within the program rewritable camera 1 shown in FIG. 1 and a second memory into which a software for effecting photographer desired functions is externally inputted and stored, thereby controlling camera operations on the basis of the software stored in the first and second memories with the result of eliminating the complication in operating members of a conventional multi-function camera.

A great number of examples of application of the present invention are conceivable. In embodiments which will be detailed hereinafter, description will be given with respect to only AF operations and photometric operations, for the simplification of description.

Figure 2:
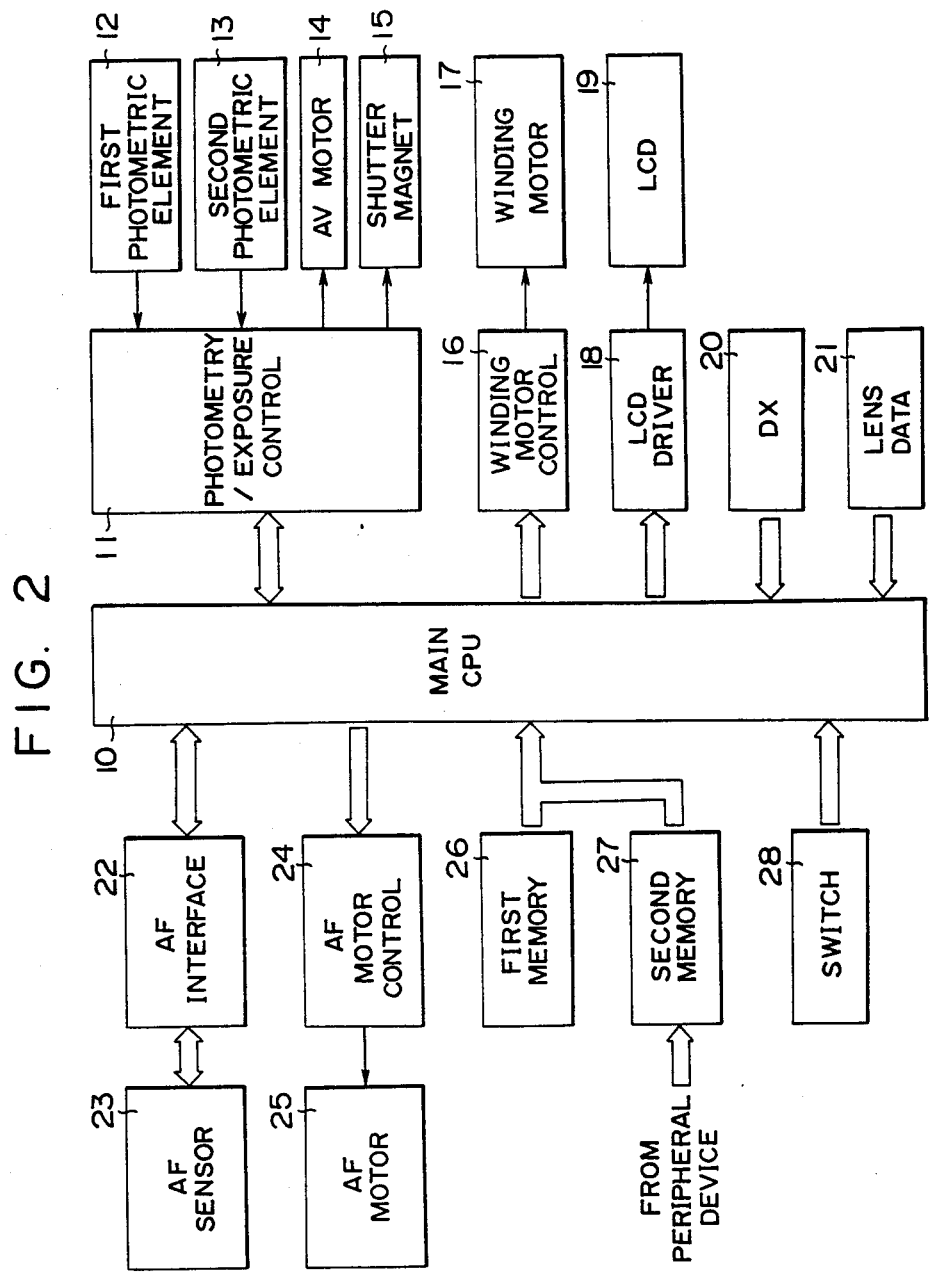
FIG. 2 is a block diagram of a control system of a program rewritable camera according to the present invention.

FIG. 2 is a block diagram of a control system for a fully automatic single-lens reflex camera to which the present invention is applied, which will be described in FIGS. 3 to 15.

A photometry/exposure control circuit 11, winding motor control circuit 16, LCD driver 18, DX circuit 20, lens data circuit 21, AF interface circuit 22, AF motor control circuit 24, first memory circuit 26, second memory circuit 27 and switch group 28 including various switches are connected to a main CPU 10. The photometry/exposure control circuit 11 has the functions of making the A/D conversion of outputs from a first photometric element 12 which effects photometry of the center of an image plane and a second photometric element 13 which effects photometry of the periphery of an image plane and of transferring the converted outputs to the main CPU 10, of controlling a motor 14 for controlling a diaphragm aperture (hereinafter referred to as an AV motor), and of controlling a magnet 15 for controlling a shutter (hereinafter referred to as a shutter magnet). The winding motor control circuit 16 controls a winding motor 17 in response to a control signal from the main CPU 10. The LCD driver 18 is a driver for displaying a shutter speed, diaphragm information and the like on an LCD 19 of a dot matrix type. The DX circuit 20 reads a DX code from a film cartridge and transfers it to the main CPU 10. The lens data circuit 21 reads information peculiar to an interchangeable lens stored thereon (a fully open F number, minimum F number, focal length, AF coefficients or the like) and transfers it to the main CPU 10. An AF interface circuit 22 effects the A/D conversion of an output from an AF sensor 23 and transfers it to the main CPU 10. An AF motor control circuit 24 controls an AF motor 25 on the basis of a control signal from the main CPU 10. A first memory circuit 26 stores a software program for effecting fundamental operations of a camera operation sequence. A second memory circuit 27 reads a software program for effecting functions which are desired by a photographer from an outer peripheral device and stores it.

An embodiment of the present invention will be described hereinafer with reference to FIGS. 3 and 4.

Figure 3:
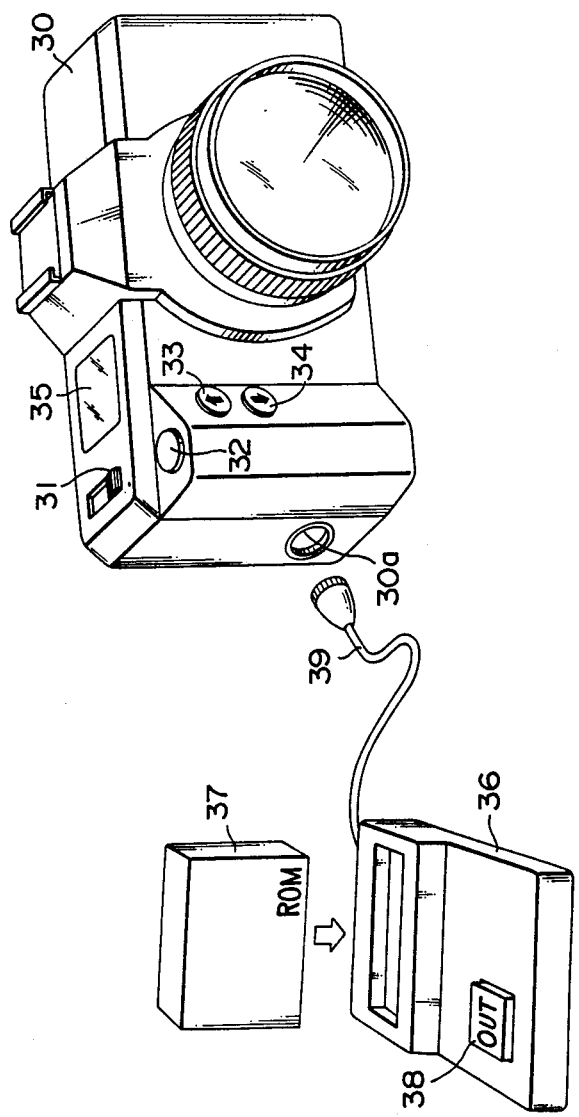
FIG. 3 is an outer perspective view showing a first embodiment of a fully automatic camera system according to the present invention.

In FIG. 3, a camera body 30 is provided with a power switch button 31, release button 32 of the two step structure, UP switch 33, DOWN switch 34 and liquid crystal display board 35. On the other hand, a peripheral device 36 is removably connected to a mount 30a of the camera body 30 by a connect cable 39. When a software program is selectively set from a memory device 37 in which a plurality of photographer's desired softwares have been stored (hereinafter referred to as a ROM pack), the software within the ROM pack 37 is transferred to the second memory circuit 27 (see FIG. 2) in the camera body by operation of an OUT button 38.

Figure 4:
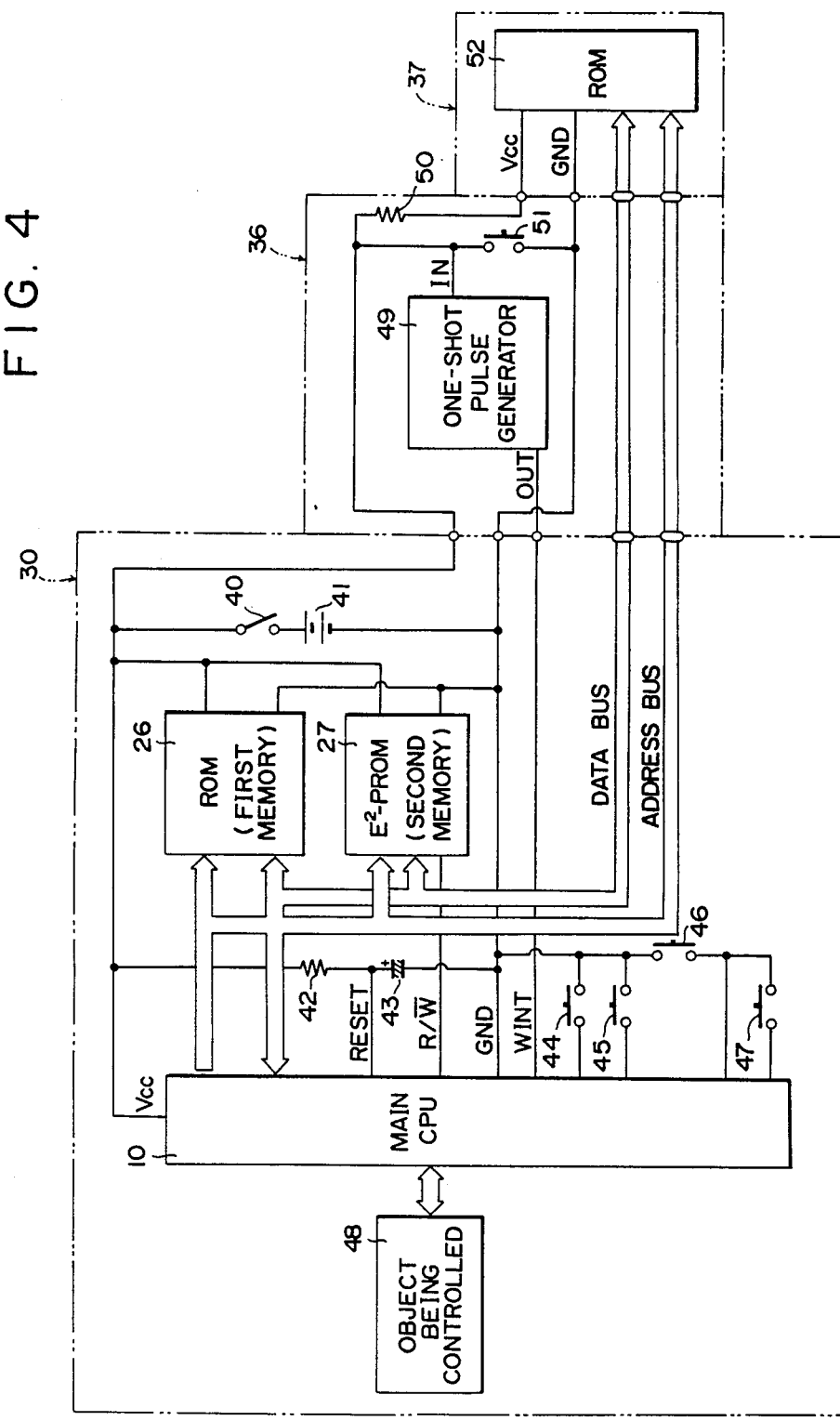
FIG. 4 is an electric circuit diagram showing essential parts of the camera shown in FIG. 3.

FIG. 4 is an electric circuit diagram of essential parts of the camera system mentioned above. When, in the camera body 30, a two-state switch 40 which is opened and closed in response to the power switch button 31, (hereinafter referred to as a power switch), is closed, a power voltage Vcc is applied to the main CPU 10, first memory circuit 26 (hereinafter referred to as a ROM) and second memory circuit 27 (hereinafter referred to as an E$^2$PROM) and a power-on reset is set to the main CPU 10 by a combination of a resistor 42 and a capacitor 43. The E$^2$PROM 27 refers to a non-volatile reading and writing memory. The main CPU 10 controls an object 48 to be controlled on the basis of two memory circuits of ROM 26 and E$^2$PROM 27.

Push switches 46 and 47 are closed in response to the release button. The push switch 46 is closed by the first step of the release button and the push switch 47 is closed by the second step thereof. Push switches 44 and 45 are closed respectively in response to the UP button 33 and DOWN button 34 and their functions are switched by a software program stored in the E$^2$PROM 27.

In the peripheral device 36 circuit, when a push switch 51 which is connected to a pull-up resistor 50 is closed in response to the OUT button 38 after the power switch 40 has been closed, a one-shot pulse circuit 49 delivers an interruption signal WINT to the main CPU 10. When a ROM 52 within the ROM pack 37 is mounted on the peripheral device 36, an address bus and a data bus are shared with the main CPU 10 in the camera body 30.

Figure 5:
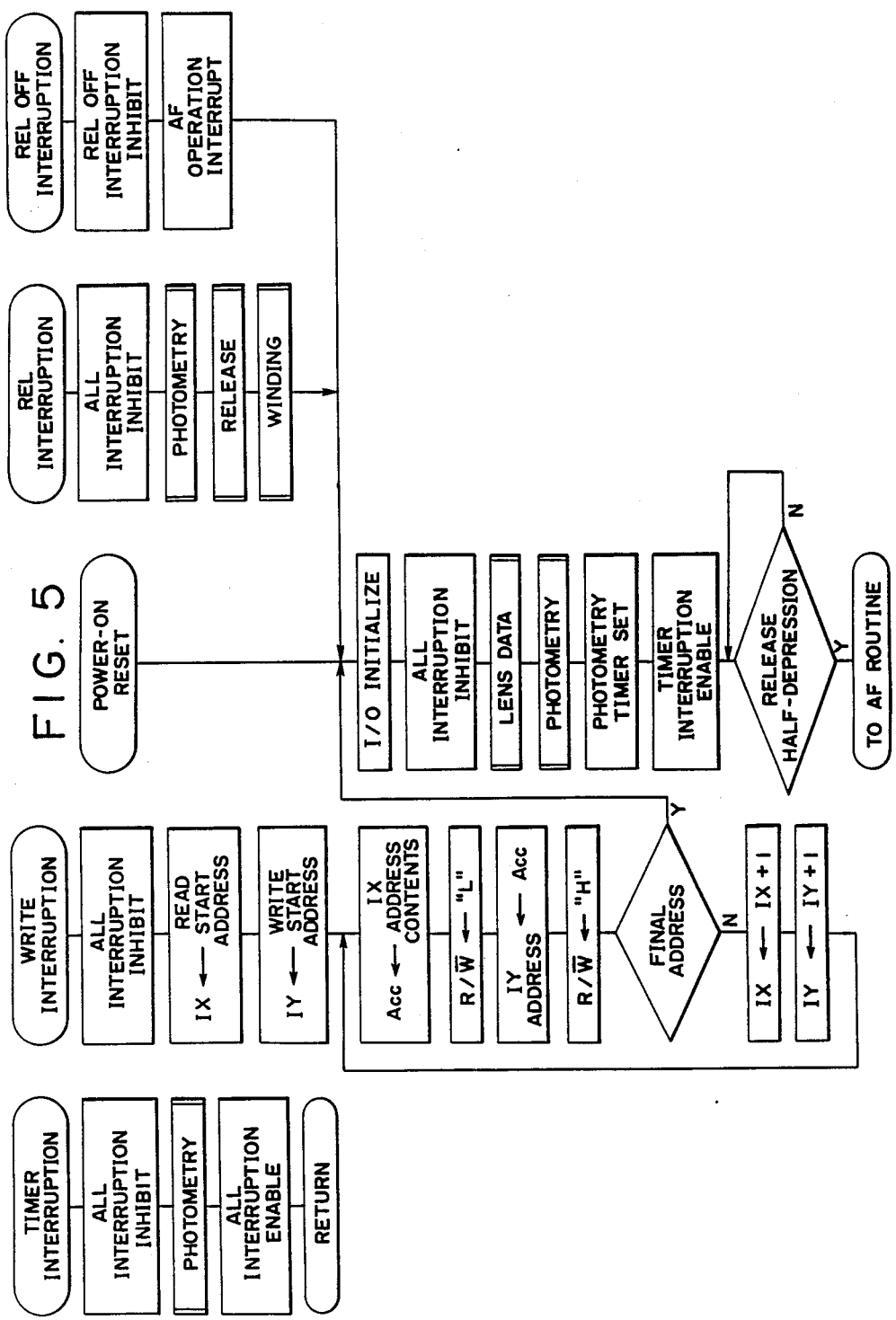
FIGS. 5 to 10 are flow charts for explaining operation of the camera shown in FIG. 3.

Camera operations of the foregoing embodiment will be described with reference to flow charts shown in FIG. 5. When a voltage Vcc is applied to the main CPU 10, the power-on reset is set to initiate a routine <Power-on reset>. Then, I/O initialization is effected and subsequently all interruption operations are inhibited and information peculiar to a lens is read from the lens data circuit 21 by a routine <Lens data>.

Subsequently, a routine <Photometry> is called, which is a software stored in the E$^2$PROM 27. In other words, it is a software program transferred from the ROM pack 37 selected by a photographer (Details will be described later). In the routine <Photometry>, while photometric modes vary with respective ROM packs, display of a shutter speed and diaphragm aperture based on photometric values are made in common.

Subsequently, a photometry timer which controls a period of photometry operation is set to enable interruption of the timer and await the half-depression of the release button 32, that is, the close of the push switch 46. When the release button 32 is half-depressed, the flow jumps to a routine <AF> which has been stored within the E$^2$PROM 27 and which is a software program originally transferred from the ROM52 in the ROM pack 37.

Now, a routine of the main CPU 10 conducting interruption will be described.

The routine of the main CPU conducting interruption includes a TIMER interruption, WRITE (write) interruption, REL(release) interruption and RELOFF-(release off) interruption. The TIMER interruption is to enable a photometry display operation to be periodically conducted and a routine <Photometry> is conducted each time of the interruption. Upon completion of the routine <Photometry>, the flow returns to a point where the interruption occurred. The WRITE interruption occurs by an interruption signal WINT which is delivered from the one-shot pulse generator 49 in the peripheral device 36. This is a routine in which contents of the ROM 52 in the ROM pack 37 are transferred to the E$^2$PROM.

When the WRITE interruption occurs, all interruptions are first inhibited and then a first address (read start address) of the ROM 52 is stored in an IX register and a first address (write start address) of the E$^2$PROM 27 is stored in an IY register. Contents of the address stored in the IX register are read into an accumulator Acc. After the R/$\overline{\text{W}}$ terminal is turned to "L" and the E$^2$PROM 27 is placed in the Write mode, the contents of the accumulator are written in the address stored in the IY register.

Then, the R/$\overline{\text{W}}$ terminal is returned to "H". Subsequently, judging whether the stored address is a final one, if not, adding 1 to the IX and IY registers, similar operations are repeated. If the final address, the flow returns to the start of the routine <Power-on reset>.

The REL interruption occurs when the push switch 47 is closed by the deep depression of the release button 32 to its second step. After all interruptions are inhibited, routines <Photometry>, <Release> and <Winding> are continuously conducted.

The RELOFF interruption occurs when the half-depression of the release button 32 is released during an AF operation, that is, the push switch 46 is opened and returns to the routine <Power-on reset> by interrupting the AF operation which has been conducted so far.

In the above embodiment, software operations which are inputted from the outside of a camera are limited to an AF operation and a photometry operation, and the AF operation is defined by two of an "AF single operation" and an "AF continuous operation" and the photometry operation is defined by three of an "average photometry program AE", "variable center-weighted photometry program AE" and "average photometry aperture-priority AE". As a result, the ROM pack 37 is provided with six kinds of combinations of the AF and photometry operations. In other words, some of all addresses in the ROM 52 may be allotted separately to the AF and photometry operations.

Each of the subroutines of the AF and photometry operations will by described with reference to FIG. 6 to 10.

Figure 6:
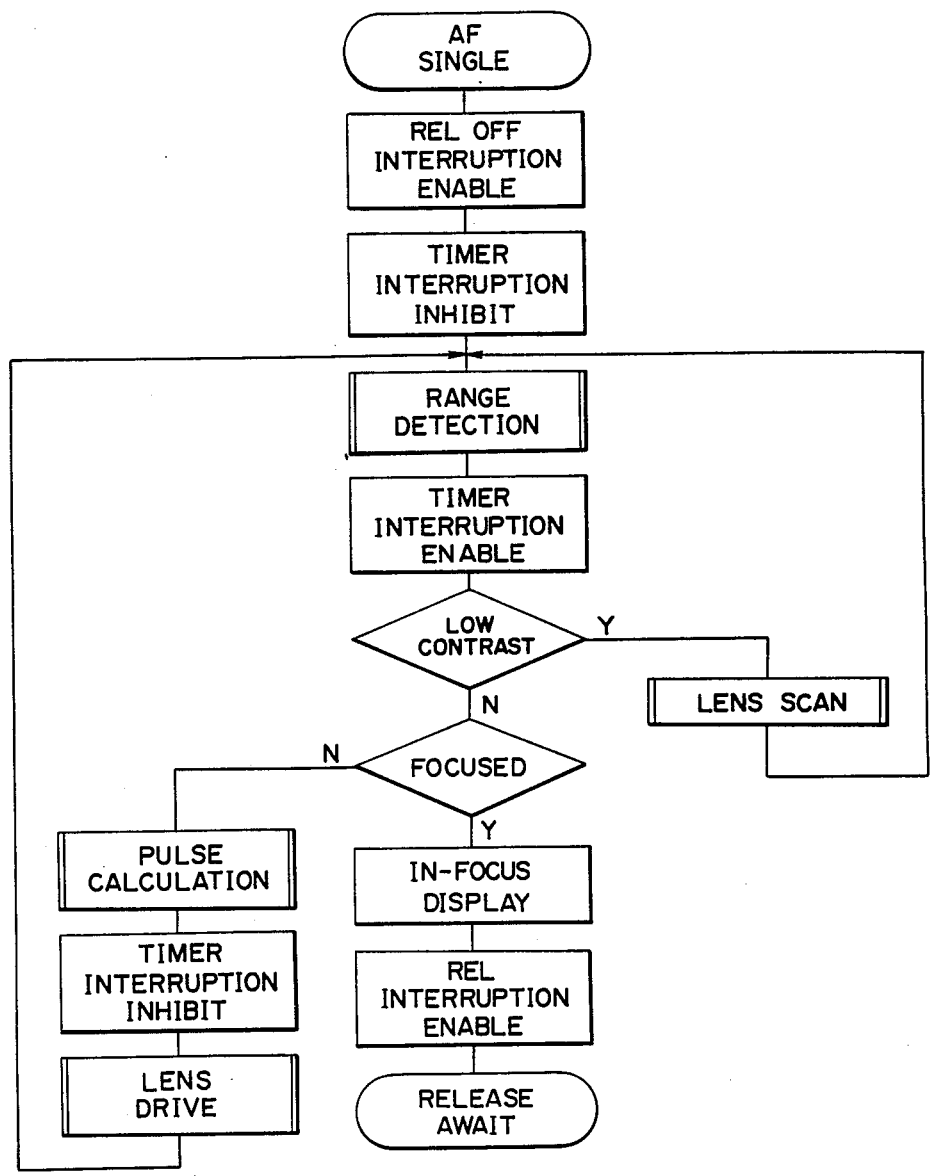

FIG. 6 is a flow chart of a routine <AF single> when an AF single mode (one-shot AF mode) is selected as an AF routine. First, the RELOFF interruption is enabled and then the TIMER interruption is inhibited and a routine <Range detection> is conducted. The inhibition of the TIMER interruption is to eliminate errors in range detecting data caused by occurrence of interruption during the range detection. Consequently, when the routine <Range detection> is completed, interruption is again enabled. The routine <Range detection> detects differences of amount and direction in a focused point of an object being photographed by the AF sensor 23 and takes in from the AF interface circuit 22. A condition of the object is judged from the taken in data regarding whether it is in a low contrast.

When the object is in a low contrast, the possibility of malfunction is increased because of a low reliability in the range detection data. Accordingly, at this time, it is necessary to seek for a scope where the object is not in a low contrast by moving a focusing lens from the present position to a point at close range and further to a point at infinity. This operation is conducted in a routine <Lens scan>. In the routine <Lens scan>, when the object is in a sufficiently high contrast or the focusing lens strikes against the end on the point at infinity side, the flow returns. After having returned, the flow again returns to the routing <Range detection>.

If the object is not in a low contrast, whether the present lens position is focused is judged. When focused, an in-focus display is made and a release operation is awaited. If not focused, a routine <Pulse calculation> in which a range difference is converted to a rotating amount of an AF motor is conducted. Inhibiting the TIMER interruption, the focusing lens is moved to the presumed in-focus position in a routine <Lens drive> and the flow returns again to the routine <Range detection>.

This operation is repeated until an in-focus condition is obtained.

Figure 7:
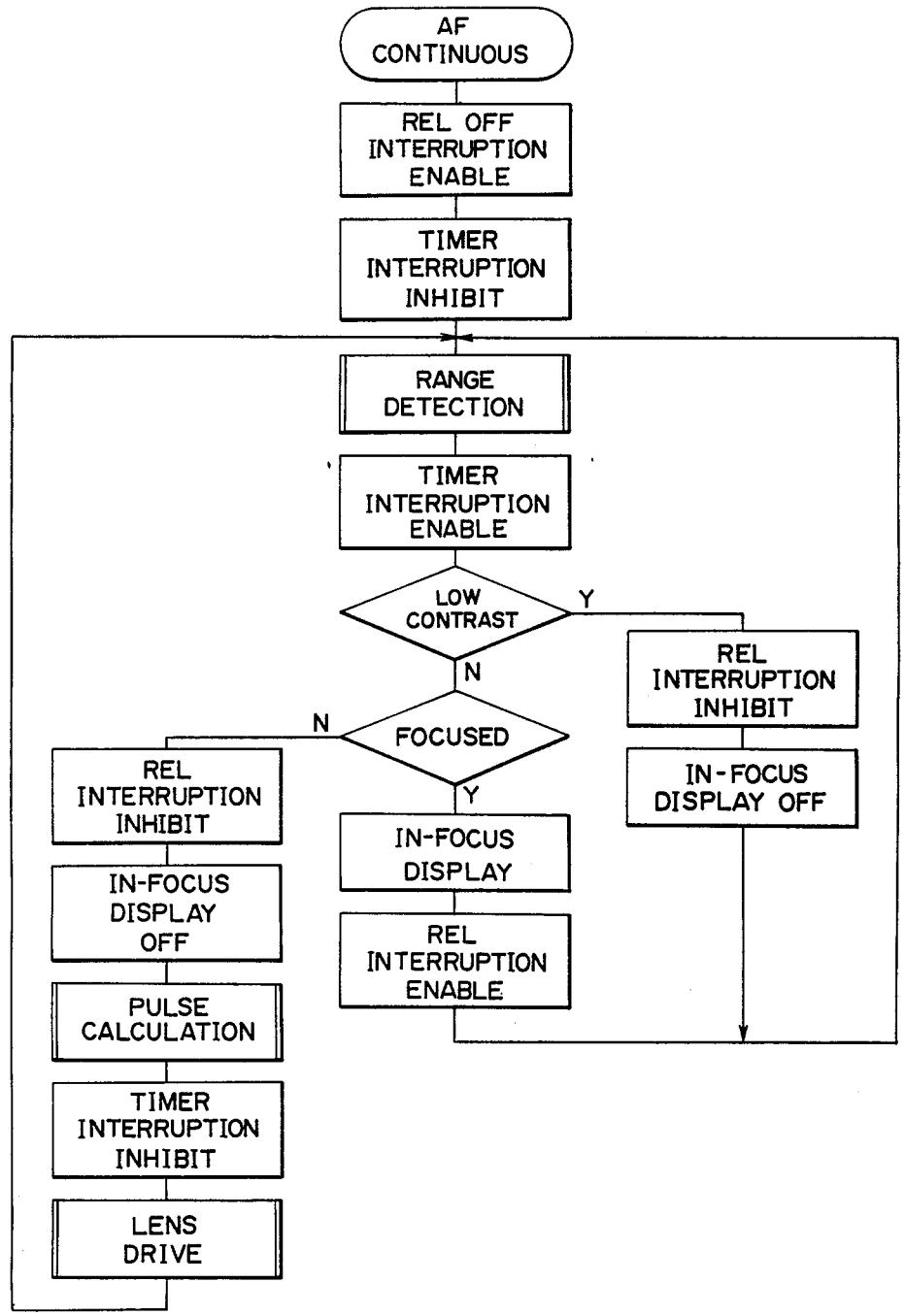

FIG. 7 is a flow chart of a routine <AF continuous> when an AF continuous mode is selected. The routine is substantially the same as the routine <AF single>. In the AF continuous mode, even once focused, only interruption of a release operation is enabled and the next AF operation is immediately initiated. Consequently, when the object is continuously tracked and the release button 32 is deeply depressed to its second step when focused, the release operation is performed.

In addition, in the AF continuous mode, the lens scan operation when the object is in a low contrast is not conducted, the release interruption is inhibited, an in-focus display is turned off and the range detection is immediately resumed.

Figure 8:
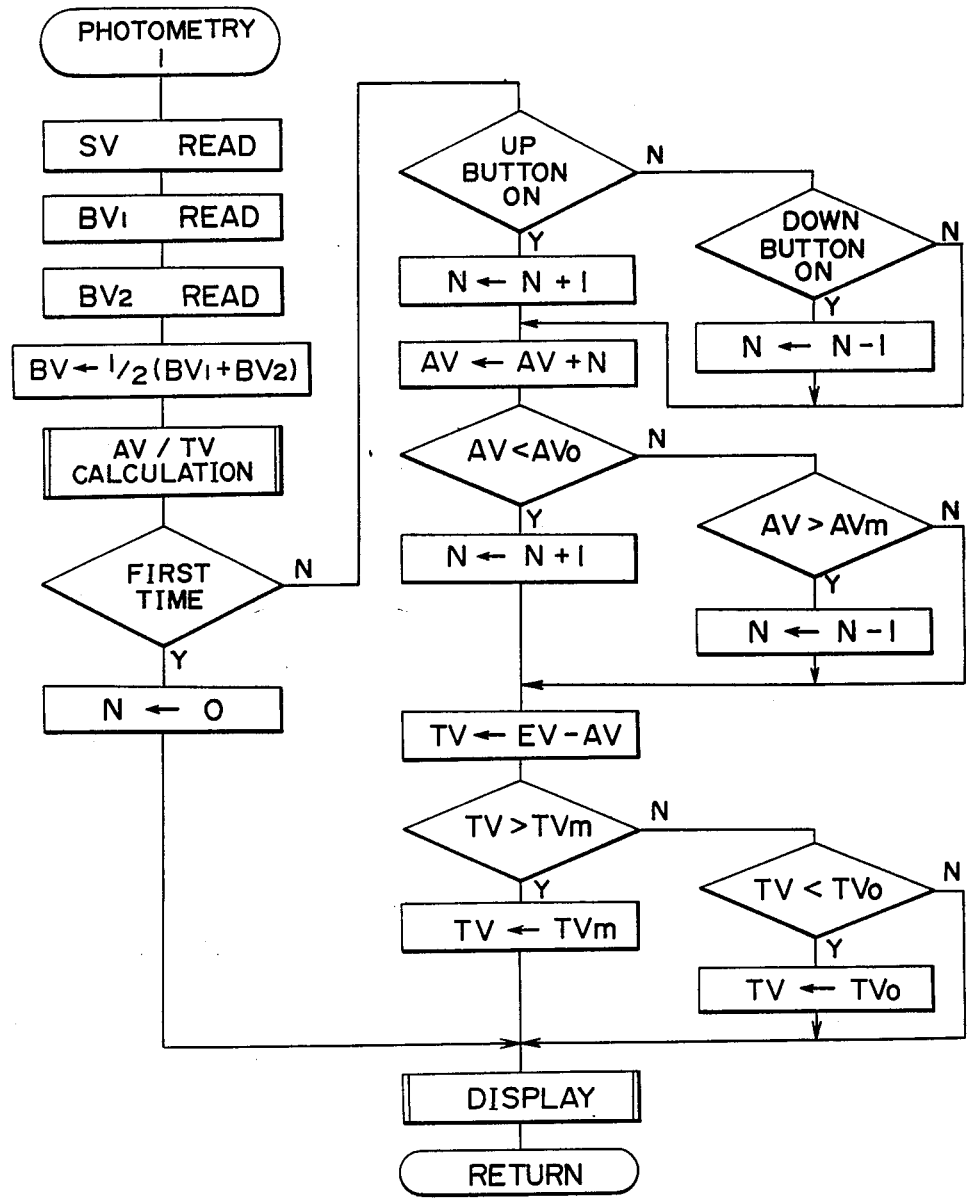

The case where an "average photometry program AE" is selected as a photometry routine will be described with reference to a routine <Photometry 1> shown in FIG. 8. When the routine <Photometry 1> is called, an ISO sensitivity of a film is first taken in the main CPU 10 from the DX circuit 20 as an SV value. Next, brightness values BV1 and BV2 of an object being photographed in respective first and second photometry circuits 12 and 13 are taken in from the photometry/exposoure control circuit 11 and an average value BV is calculated. Subsequently, in a routine <AV/TV calculation>, a programmed optimum aperture and a shutter speed are calculated based on the SV value, BV value, fully open F No. of a lens (AVo), minimum F No. (AVm), maximum shutter time (TVm), minimum shutter time (TVo) and the like.

Thereafter, judging whether the photometry operation is at a first time, if so, 0 is stored in a register N and the flow proceeds to a routine <Display>. If not, then follows check of conditions of the push switches 44 and 45 which are respectively in response to the UP button 33 and DOWN button 34. When the push switch 44 is on, the UP button 33 is on, so that 1 is added to a register N. On the other hand, when the push switch 45 is on, the DOWN button 34 is on, so that 1 is subtracted from the register N.

Subsequently, an aperture (AV value) is corrected by a value in the register N and a shutter speed (TV value) is corrected correspondingly. However, a scope of the correction is not in excess of the foregoing minimum FNo. (AVm), fully open F No. (AVo), maximum shutter time (TVm) and minimum shutter time (TVo). In other words, this is to shift programmed AV and TV values within a scope of proper exposure by depressing the UP button 33 or the DOWN button 34 by a photographer.

Thus, at this time, the UP and DOWN buttons 33, 34 serve as a program shift button.

Subsequently, in the routine <Display>, the present AF and photometry modes are displayed on the LCD 19 with a dot matrix type display through the LCD driver 18. In addition, functions of the UP and DOWN buttons 33, 34 are also displayed on the LCD 19. Consequently, a structure of the display varies with the software stored in the $E^2PROM$ 27, that is, the one externally inputted.

Figure 9:
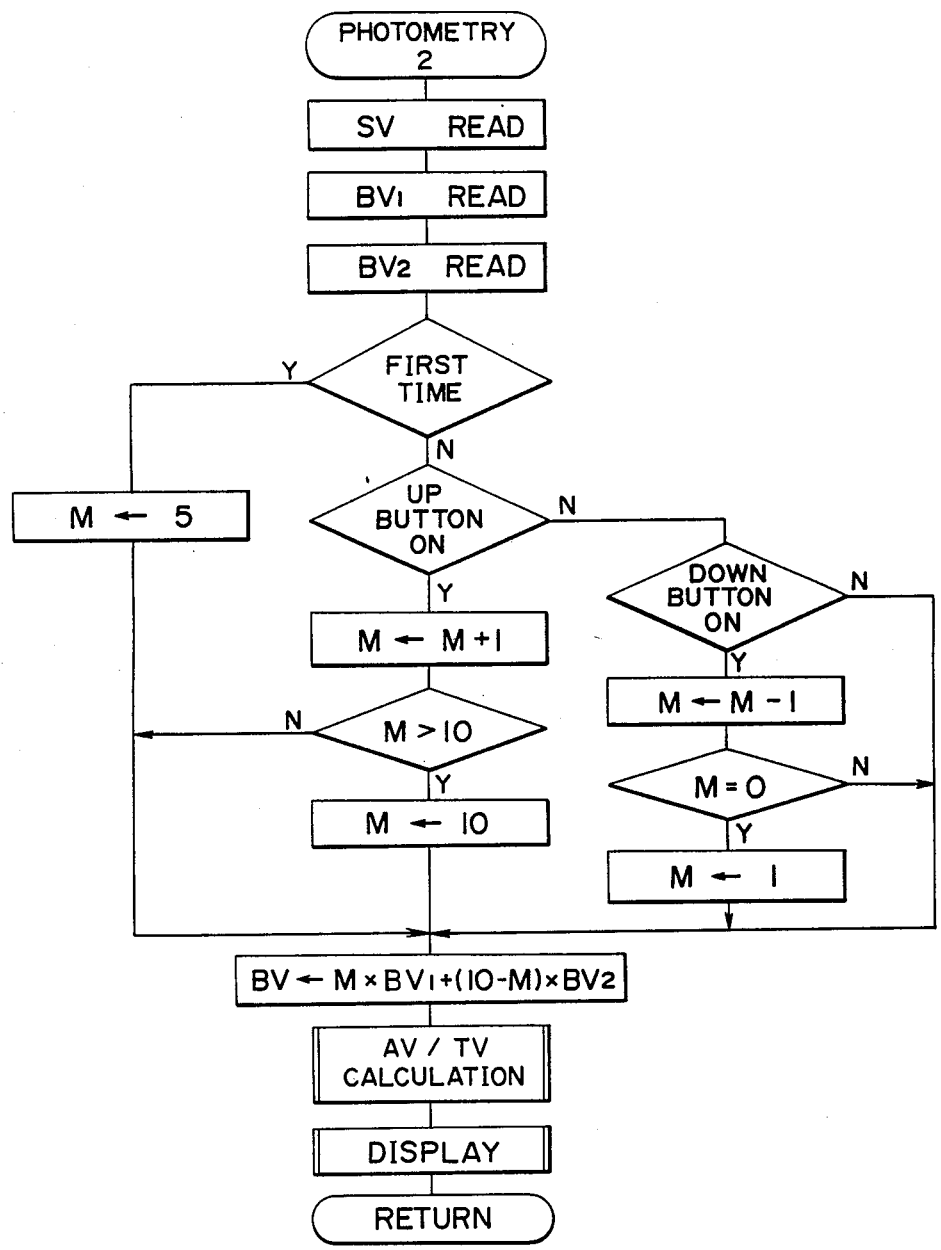

The case where a "variable center-weighted photometry program AE" is selected as a photometry routine will be described with reference to a routine <Photometry2> shown in FIG. 9. In this case, the UP and DOWN buttons 33, 34 serve as switching buttons for changing a ratio in the center-weighted photometry as compared with the foregoing routine <Photometry 1>.

The flow reads in SV, BV1, and BV2 values in a manner similar to the routine <Photometry 1> and when the operation is at a first time, 5 is stored in a register M. If not a first time, judging whether the UP button 33 is on, if so, 1 is added to the register M. If not, then follows check of a condition of the DOWN button 34. If the DOWN button 34 is on, 1 is subtracted from the register M. The numerical value to be stored in the register M are not in excess of 1 to 10.

When the register M is set, the BV value is calculated. Specifically, the variable center-weighted photometry is realized by obtaining the BV value by giving weight stored in the register M to a brightness BV1 in the center of a picture plane and a brightness BV2 in the periphery thereof. Then follows calculation of a diaphragm aperture and shutter speed in a routine <AT/TV calculation>. These values are displayed on the LCD 19 together with display of AF and photometry modes and display of functions of the UP and DOWN buttons 33, 34.

Figure 10:
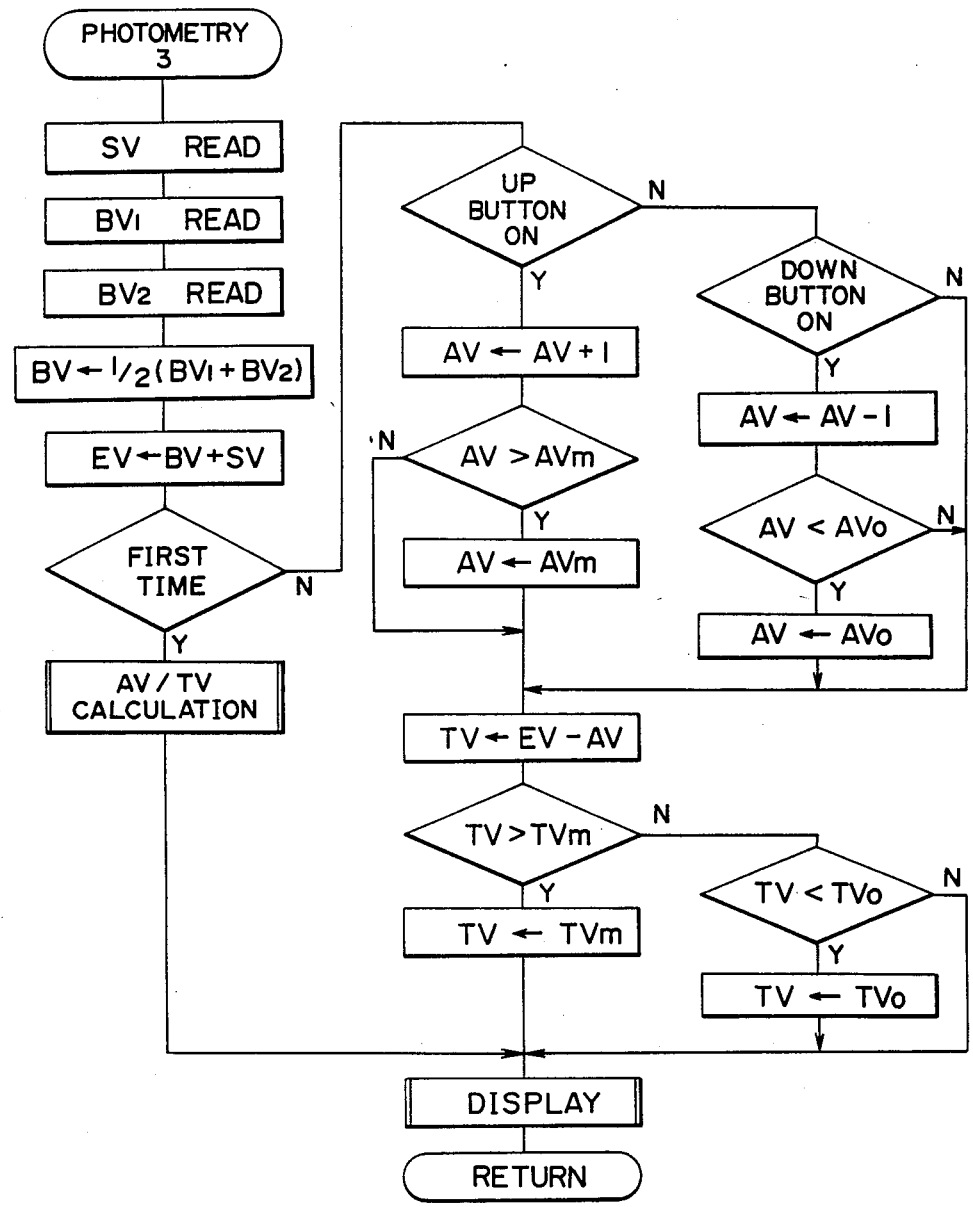

The case where an "average photometry aperture-priority AE" is selected as a photometry routine will be described with reference to a routine <Photometry 3> shown in FIG. 10. Operations to calculation of an average value BV are similar to the routine <Photometry 1>.

After an EV value is calculated, if the operation is at a first time, a diaphragm aperture and shutter speed are properly set in an ordinary routine <AV/TV calculation>. When on and after the second time, an AD value is shiftable from the minimum F No. (AVm) to the fully open FNo. (AVo) in accordance with conditions of the UP and DOWN buttons 33, 34. Consequently, the UP and DOWN buttons 33, 34 in this case serve as a shift button of an AV value. When an AV value is set, a TV value is determined by the EV value which has been previously obtained.

When the AV and TV values are determined, AF and photometry modes are displayed together with functions of the UP and DOWN buttons 33, 34 in a routine <Display>.

Figure 11:
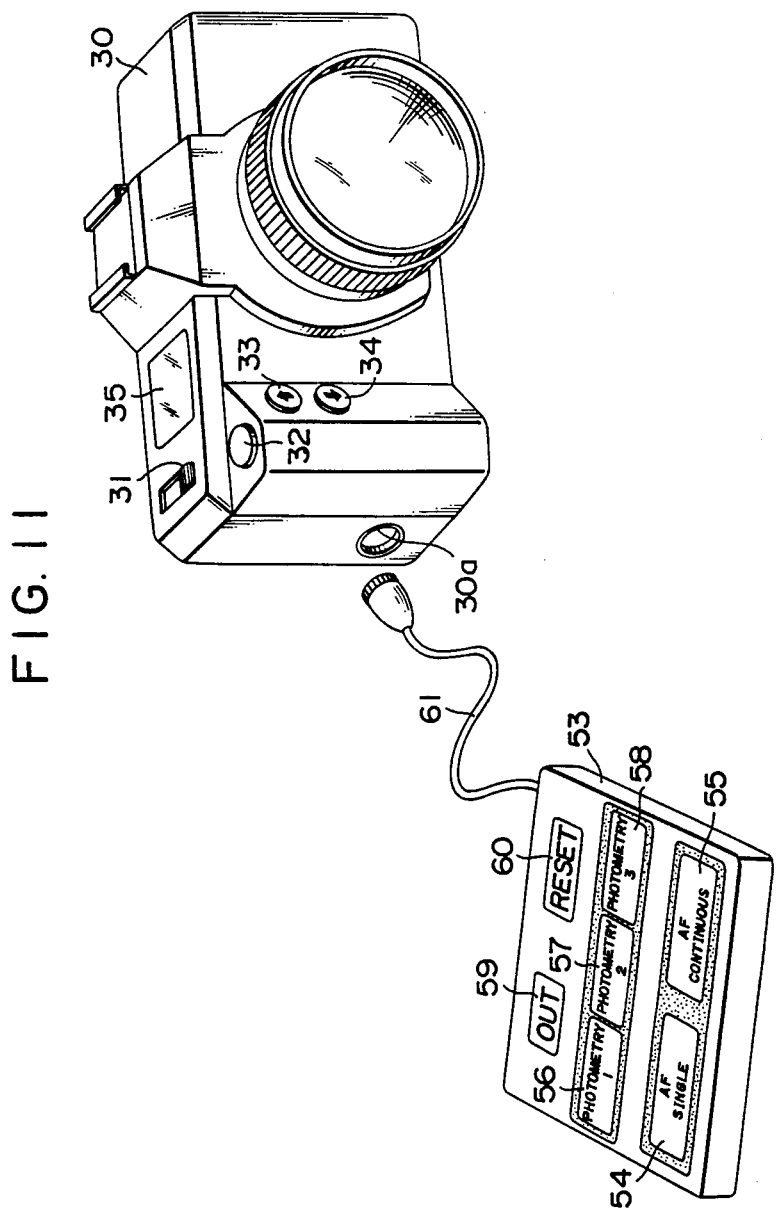
FIG. 11 is an outer perspective view showing a second embodiment of a fully automatic camera system according to the present invention.

A second embodiment of the present invention will be described with reference to FIGS. 11 and 12. In the second embodiment, a plurality of additional functions are stored in a ROM of a large capacity in a peripheral device so as to transfer functions which a photographer desires to a memory in the camera body. In FIG. 11, a peripheral device 53 is adapted to be connected to a mount 30a of the camera body 30 by a connect cable 61. In addition, on the upper surface of the device 53 are arranged AF single button 54 and AF continuous button 55 for selecting AF modes, Photometry 1 button 56, Photometry 2 button 57, Photometry 3 button 58, OUT button 59 and RESET button 60 for selecting photometry modes.

Figure 12:
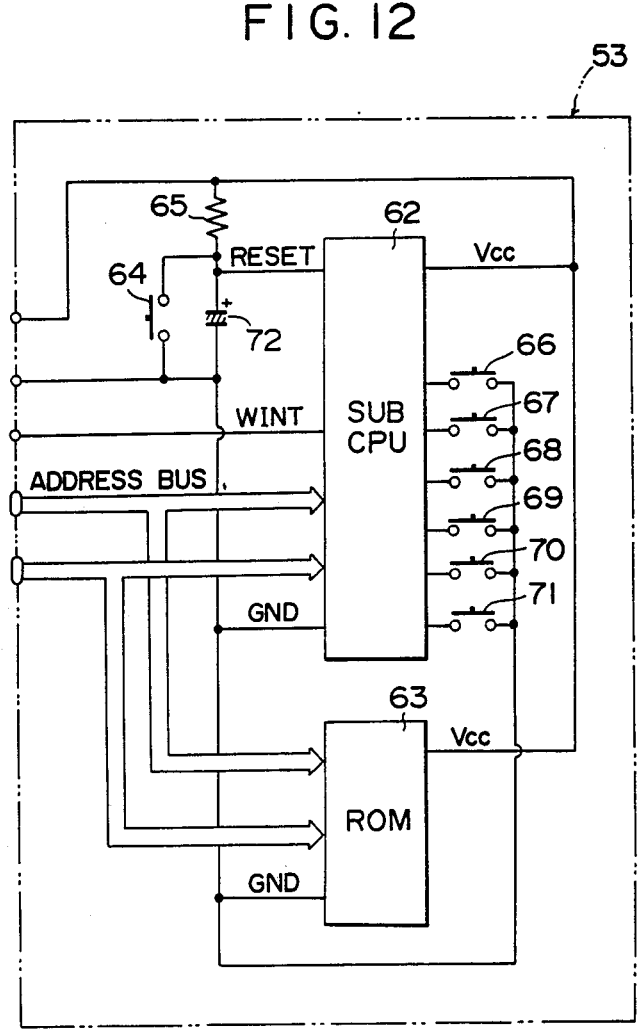
FIG. 12 is an electric circuit diagram showing essential parts of a peripheral device shown in FIG. 11.

FIG. 12 shows an electric circuit of the peripheral device 53. In FIG. 12, since an electric circuit of the camera body 30 is the same as that shown in FIG. 4, it is omitted. When a sub-CPU 62 and a ROM 63 are connected to the camera body, they share an address bus and data bus with the main CPU 10 in the camera body 30. When the peripheral device 53 is connected to the camera body 30 by the connect cable 61, a power voltage Vcc is supplied to the sub-CPU 62 and ROM 63 from the camera body 30 and a power-on reset is set to the sub-CPU 62 by a combination of a resistor 65 and a capacitor 72.

Push switches 66, 67, 68, 69, 70 and 71 are closed in response to the AF single button 54, AF continuous button 55, Photometry 1 button 56, Photometry 2 button 57, Photometry 3 button 58 and OUT button 59.

Figure 13:
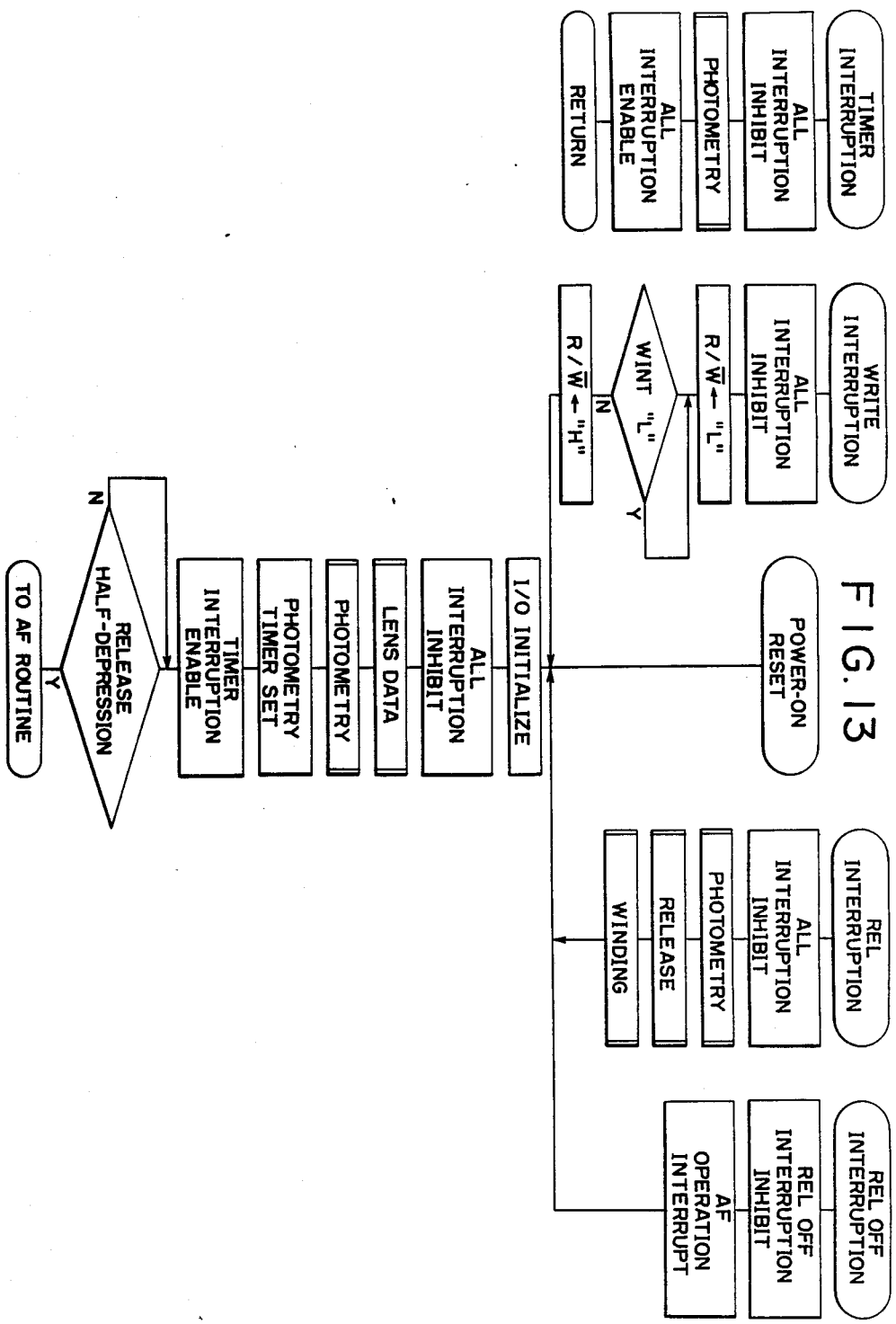
FIG. 13 is a flow chart for explaining operation of the camera shown in FIG. 11.

A push switch 64 is closed in response to the RESET button 60 to set the sub-CPU 62 to a reset. In the second embodiment, since the sub-CPU 62 extracts subroutines for conducting functions selected by a photographer from the ROM 63 in the peripheral device 53 and transfers them to the E$^2$PROM 27 in the camera body, operations of the main CPU 10 only differs from those of the first embodiment in a routine <WRITE interruption>, as shown in FIG. 13.

In operation, the routine <WRITE interruption> shown in FIG. 13 will be described. The interruption occurs when the sub-CPU 62 renders an interruption signal WINT "L" to the main CPU 10. Upon occurrence of the interruption, after all interruptions are inhibited, an R/$\overline{\text{W}}$ signal is turned to "L" to render the E$^2$PROM in the WRITE mode, thereafter awaiting until the interruption signal WINT becomes "H". Detecting that the signal WINT becomes "H", the R/$\overline{\text{W}}$ signal is returned to "H" to return to a routine <Power-on reset>.

Figure 14:
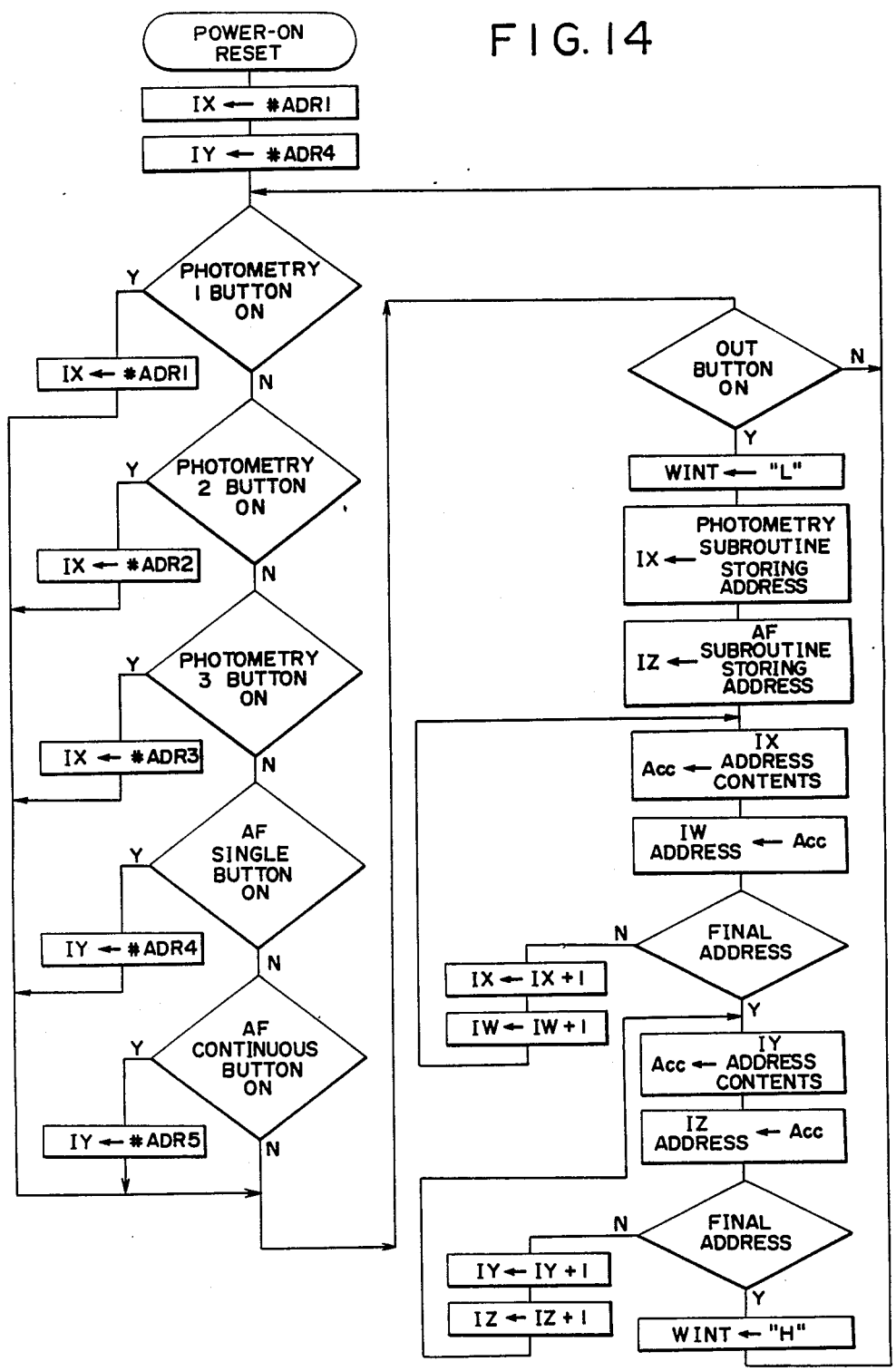
FIG. 14 is a flow chart for explaining operations of a sub-CPU in the peripheral device shown in FIG. 12.

FIG. 14 shows a flow chart of operations of the sub-CPU 62 in the peripheral device 53. When set to the power-on reset, the sub-CPU 62 conducts the routine <Power-on reset>. First, in order to set an initial mode, an address (ADR 1 address) in which the routine <Photometry 1> has been stored is stored in a register IX and an address (ADR 4 address) in which the routine <AF single> has been stored is stored in a register IY. Subsequently, checking conditions of switches, if any switches are on, ROM addresses which have stored software routines of functions corresponding to the switches are stored in the register IX or IY. This operation is continued until a switch 71 of the OUT button 59 turns on.

When the switch 71 of the OUT button 59 turns on, the interruption signal WINT is rendered "L" to set a WRITE interruption to the main CPU 10. Subsequently, an address into which a photometry routine is to be transferred is stored in a register IW and an address into which an AF routine is to be transferred is stored in a register IZ. Then, contents of an address which is indicated by the register IX are read in an accumulator (Acc) to store them in an address indicated by the register IW. This operation is continued to the final address of the photometry routine. Then follows the operation that contents of an address indicated by the register IY are stored in an address indicated by the register IZ, in a manner similar to the above operation. This operation is repeated to the final address of the AF routine. When all transferring operations are completed, the signal WINT is rendered "H" to check again conditions of switches responding to the operating buttons.

FIG. 15 is a modification of the second embodiment of the present invention. The distinction between the modification and the second embodiment is that switch inputs are replaced by bar code inputs given by a bar code reader. In FIG. 15, examples of bar codes are Photometry 1, Photometry 2, Photometry 3, AF single and AF continuous (84 to 88). It is possible to select a desired function by inputting it with a bar code reader 83 in a manner similar to the switch input.

As described with first and second embodiments, while a photographer selects desired functions and stores them in the camera body, it is possible to have functions other than those presented by a camera manufacturer by preparing and transferring softwares by a photographer himself.

Furthermore, while the E$^2$PROM is employed as a memory on the camera side, the same effects can be obtained even when a RAM having a backup function or a magnetic memory is employed.

In addition, all memories within the camera body may be rewritable with the E$^2$PROM.

In the first and second embodiments, if the second memory and data input portions within the camera body are rendered removable from the camera body, a photographer can select one of a plurality of prepared second memories to use it as occasion arises.

What is claimed is:

1. A camera system including a camera which operates in response to coded control orders and a peripheral device of the camera, said camera including camera elements which conduct camera operations, first memory means for storing said coded control orders, input means for rewriting part or all of contents stored in said first memory means from the outside of the camera, and control means for controlling said camera elements in response to control orders stored within said first memory means; characterized in that said peripheral device comprises second memory means in which is stored at least one control order package for controlling the camera; and transfer means for transferring part or all of the contents stored in said second memory means through said input means to said first memory means.

2. A camera system according to claim 1 in which said transfer means includes demand signal output means for delivering command signals to the camera prior to the transfer operation.

3. A camera system according to claim 1 in which said input means initiates the rewriting operation in said first memory means in response to command signals from said peripheral device.

4. A camera comprising:
camera elements for conducting camera operations;
control means for controlling said camera elements in response to coded control orders;
first memory means for storing said control orders, and
input means for rewriting part or all of contents stored in said first memory means by a peripheral device disposed outside of the camera.

5. A camera according to claim 4 in which said first memory means comprises a first memory portion whose contents are not rewritable and a second memory portion whose contents are rewritable.

6. A camera according to claim 4 in which
said first memory means is composed of a memory medium whose contents are all rewritable.

7. A camera according to claim 4 in which said control means has at least one manual operating member, a function of said manual operating member being determined by a control order stored in said memory means.

8. A camera according to claim 4 in which said camera elements include display means for displaying information associated with camera operations and displaying contents of said display means are controlled by said control means on the basis of control orders stored in said memory means.

9. A camera according to claim 8 in which said display means displays functions of said manual operating members.

10. A camera according to claim 8 in which said display means displays camera operation modes.

11. A camera which operates in response to coded control orders; comprising:
camera elements for conducting camera operations;
memory means for inputing said control orders from a peripheral device disposed outside the camera and storing said control orders; and
control means for controlling said camera elements in response to said control orders stored in said memory means.

12. A camera according to claim 11 in which said memory means is removably mounted to said camera.

13. A peripheral device adapted to be connected to a camera having first memory means for storing coded control orders to control camera operations, part or all of contents stored in said first memory means being externally rewritable; comprising:
connect means for connecting said device to the camera;
second memory means in which at least one control order package to control the camera is stored; and
transfer means for transferring part or all of contents stored in said second memory means to the first memory means of the camera.

14. A peripheral device according to claim 13 in which
said transfer means includes selector means for selecting any control order package from at least one control order package stored in said second memory means.

15. A peripheral device according to claim 14 in which
said selector means includes means for reading in codes corresponding to said respective control order packages and selects a control order package in accordance with said codes.

16. A peripheral device according to claim 13 in which
said second memory means comprises a ROM package which is removably mounted to said peripheral device.

17. A peripheral device according to claim 13 in which
said transfer means include means for generating a transfer initiate signal to initiate transfer of a control order package.

18. A peripheral device according to claim 14 in which
said selector means include selector switches for selecting the desired control order package when operated.

19. A peripheral device according to claim 14 in which
said selector means includes sensor means and a plurality of different indicia;
said sensor means selecting one of the control order packages according to the indicia read by said sensor means.

20. A peripheral device according to claim 13 in which
said transfer means comprises a central processing unit for selecting a control package from those stored in the second memory means.

* * * * *

UNITED STATES PATENT AND TRADEMARK OFFICE
CERTIFICATE OF CORRECTION

PATENT NO. : 4,853,733

DATED : August 1, 1989

INVENTOR(S) : Watanabe et al.

It is certified that error appears in the above-identified patent and that said Letters Patent is hereby corrected as shown below:

Column 1, line 18, "multi-program" should be
-- Multi-program --

Column 5, line 17, "FIG." should be --FIGS.--

Column 10, line 4, "inputing" should be
--inputting--

Signed and Sealed this

Tenth Day of September, 1991

Attest:

HARRY F. MANBECK, JR.

Attesting Officer

Commissioner of Patents and Trademarks

(12) EX PARTE REEXAMINATION CERTIFICATE (6283rd)
United States Patent
Watanabe et al.

(10) Number: US 4,853,733 C1
(45) Certificate Issued: Jul. 8, 2008

(54) PROGRAM REWRITABLE CAMERA

(75) Inventors: Youji Watanabe, Sagamihara (JP); Minoru Matsuzaki, Hachioji (JP); Junichi Itoh, Hachioji (JP)

(73) Assignee: Olympus Optical Company Limited, Hatagaya, Shibuya-Ku, Tokyo (JP)

Reexamination Request:
No. 90/007,504, Apr. 13, 2005

Reexamination Certificate for:
Patent No.: 4,853,733
Issued: Aug. 1, 1989
Appl. No.: 07/216,761
Filed: Jul. 8, 1988

Certificate of Correction issued Sep. 10, 1991.

(51) Int. Cl.
*G03B 17/00* (2006.01)
*G03B 7/091* (2006.01)

(52) U.S. Cl. .................................. 396/300; 348/211.6
(58) Field of Classification Search .................. None
See application file for complete search history.

(56) References Cited

U.S. PATENT DOCUMENTS 4,156,926 A * 5/1979 Hartman ..................... 711/103
4,855,779 A * 8/1989 Ishikawa et al. ............. 396/211

FOREIGN PATENT DOCUMENTS

| JP | 58-126521 | * 7/1983 |
| JP | SHO-58-113021 | 8/1983 |
| JP | SHO-60-064343 | 4/1985 |

* cited by examiner

*Primary Examiner*—Ovidio Escalante

(57) ABSTRACT

A program rewritable camera includes camera elements for conducting camera operation, a control circuit for controlling said camera elements in response to coded control orders, a first memory for storing said control orders and an input circuit for enabling part or all of the contents stored in said first memory to rewrite by a peripheral device disposed outside the camera body. Connecting the peripheral device to the camera, camera functions desired by a photographer can be transferred to and stored in said first memory from the peripheral device in which various camera functions have been stored, through said input circuit to put the camera into action.

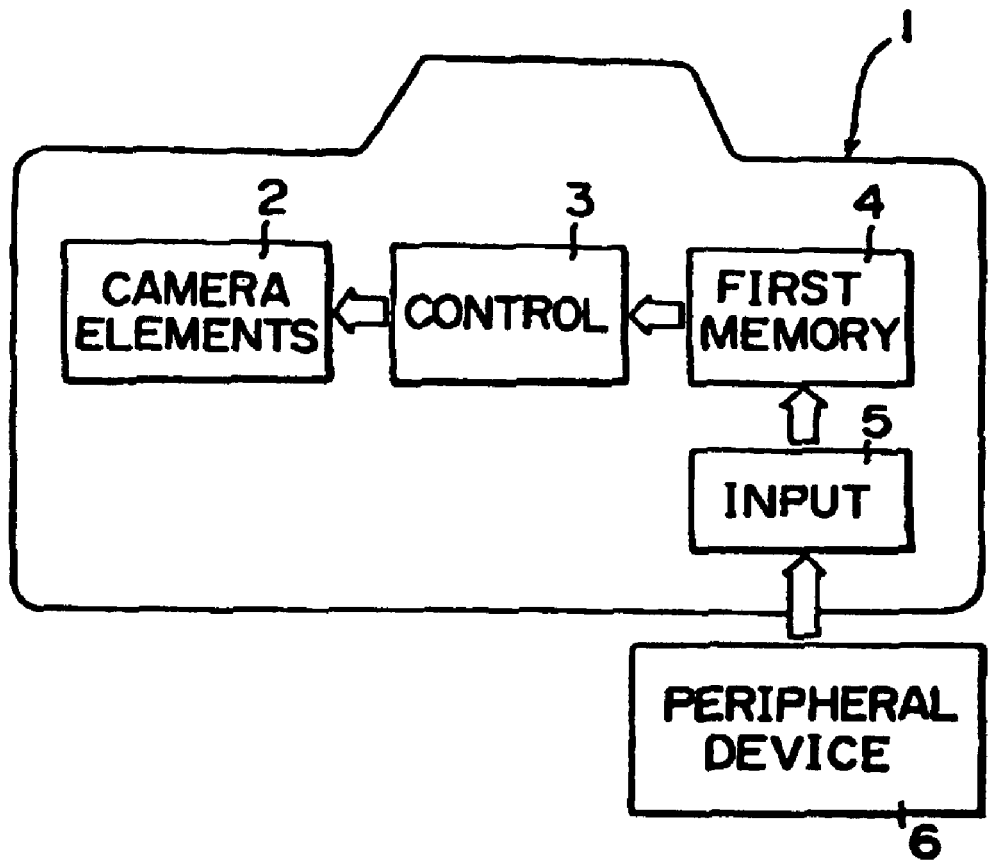

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–15 and 17–20 are cancelled.

Claim 16 is determined to be patentable as amended.

New claims 21 and 22 are added and determined to be patentable.

16. A peripheral device [according to claim 13 in which] *adapted to be connected to a camera having first memory means for storing a software program for controlling camera operations, in which* part or all of the contents stored in said first memory means being externally rewritable into the *first memory means from a location external to the camera by an* input means in said camera; *comprising:*

*connection means for connecting said peripheral device to the camera;*

*second memory means in which at least one software program package to control the camera is stored; and*

*transfer means for transferring part or all of contents stored in said second memory means to the first memory means of the camera, said transfer means including selector means for selecting any software program package from software program packages stored in said memory means,* said second memory means [comprises] *comprising* a ROM package which is removably mounted to said peripheral device.

*21. A camera which functions in accordance whith a given software program, comprising:*

*a member provided on the camera;*

*a switch whose state is controlled by said member;*

*camera elements for effecting camera operations;*

*rewriteable memory means for storing said given software program;*

*a central processing unit (CPU) responsive to detection of a change of state of said switch, entering into a camera elements operating mode, controlling the operations of the camera elements in accordance with said given software program stored in said memory means, said CPU entering a memory rewriting mode for controlling inputting of a different software program, stored in a second memory means in a peripheral device disposed outside of said camera, into said camera and writing said different software program into said rewriteable memory means in place of said given software program, wherein operation of said camera elements is prevented when said CPU is in said memory rewriting mode, said CPU and peripheral device being connected by way of a communication line independent of data in the second memory means and the CPU enters the memory rewriting mode responsive to a command signal from said peripheral device.*

*22. A camera which functions in accordance with a given software program, comprising:*

*a member provided on the camera;*

*a switch whose state is controlled by said member;*

*camera elements for effecting camera operations;*

*rewriteable memory means for storing said given software program;*

*a central processing unit (CPU) responsive to detection of a change of state of said switch, entering into a camera elements operating mode, controlling the operations of the camera elements in accordance with said given software program stored in said memory means, said CPU entering a memory rewriting mode for controlling inputting of a different software program, stored in a second memory means in a peripheral device disposed outside of said camera, into said camera and writing said different software program into said rewriteable memory means in place of said given software program, wherein operation of said camera elements is prevented when said CPU is in said memory rewriting mode, wherein said CPU is prevented from detecting change of state of said switch when in the memory rewriting mode.*

\* \* \* \* \*